US012330885B2

(12) United States Patent
Imes et al.

(10) Patent No.: US 12,330,885 B2
(45) Date of Patent: Jun. 17, 2025

(54) LANED CONTAINER FLOW EQUALIZER

(71) Applicant: ILLINOIS TOOL WORKS INC., Glenview, IL (US)

(72) Inventors: Douglas A. Imes, Greer, SC (US); Geromy Lanich, Greer, SC (US); Craig Mummert, Greer, SC (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 221 days.

(21) Appl. No.: 18/101,465

(22) Filed: Jan. 25, 2023

(65) Prior Publication Data

US 2023/0234786 A1 Jul. 27, 2023

Related U.S. Application Data

(60) Provisional application No. 63/303,240, filed on Jan. 26, 2022.

(51) Int. Cl.
*B65G 47/29* (2006.01)
*B65G 47/71* (2006.01)
*B65G 47/88* (2006.01)

(52) U.S. Cl.
CPC ............ *B65G 47/29* (2013.01); *B65G 47/71* (2013.01); *B65G 47/8823* (2013.01); *B65G 2203/0241* (2013.01); *B65G 2203/042* (2013.01); *B65G 2205/04* (2013.01)

(58) Field of Classification Search
CPC ..... B65G 47/29; B65G 47/71; B65G 47/8823

USPC ........................................................ 198/463.4
See application file for complete search history.

(56) References Cited

U.S. PATENT DOCUMENTS

| | | | | |
|---|---|---|---|---|
| 3,337,021 A | * | 8/1967 | Stewart ................. | B65G 47/29 198/459.7 |
| 6,371,278 B1 | * | 4/2002 | Hart ....................... | B65B 23/12 198/462.2 |
| 9,533,784 B2 | * | 1/2017 | Van Gerwen .......... | B65B 1/366 |
| 9,533,837 B2 | * | 1/2017 | Stitt ....................... | B65G 47/71 |
| 10,947,060 B2 | * | 3/2021 | Cohen ................... | B65G 1/1373 |
| 12,054,344 B2 | * | 8/2024 | Laskis .................... | B65G 47/71 |
| 2010/0038210 A1 | * | 2/2010 | Cox et al. | |

FOREIGN PATENT DOCUMENTS

| | | | | |
|---|---|---|---|---|
| DE | 19546398 A1 | * | 6/1997 | ............ B65G 47/71 |
| WO | WO-2022022879 A1 | * | 2/2022 | ............ B65G 43/08 |
| WO | WO-2023015029 A1 | * | 2/2023 | ............ B65G 43/08 |

* cited by examiner

*Primary Examiner* — Douglas A Hess
(74) *Attorney, Agent, or Firm* — Pauley Erickson & Swanson

(57) ABSTRACT

A system for controlling a flow of articles includes a conveyor driven in a direction to convey articles in the direction. A plurality of lanes are disposed along a portion of the conveyor. Each lane accepts a row of articles along the conveyor direction. A plurality of sensors count the articles in each lane. A plurality of actuators control the flow rates of the articles by comparing and adjusting the flow rates in respective lanes.

13 Claims, 2 Drawing Sheets

LANED CONTAINER FLOW EQUALIZER

CROSS-REFERENCE TO RELATED APPLICATIONS

This application claims priority to U.S. Provisional Application, Ser. No. 63/303,240, filed 26 Jan. 2022. This U.S. Provisional Application is hereby incorporated by reference herein in its entirety and are made a part hereof, including but not limited to those portions which specifically appear hereinafter.

BACKGROUND OF THE INVENTION

Field of the Invention

This invention relates generally to conveyor systems, and more particularly, to a flow equalizer for conveyor systems.

Description of Prior Art

Current conveyor systems use a variety of systems and processes to more smoothly and efficiently convey items, especially for cartoners and case packers. While conveyors can be used to process a wide variety of items, certain items such as bottles, cans, cartons, etc. are desirably conveyed in single file lanes for better organization and packing after such items leave the conveyor.

Lane balancing systems have been employed that stop conveyor lanes with side belts, overhead belts, or other gate-type systems. The belts/gates can allow a certain number of articles to flow through a conveyor lane for a specific length of the conveyor and/or for a specific amount of time. Balancing the number of articles in each lane has been attempted by flowing a certain number of articles from a single lane into individual lanes using a lane divider on the conveyor system.

However, even with lane dividers and gate or belt systems, specific lanes across a conveyor may contain a different number of articles or flow articles at different speeds in comparison to adjacent lanes. Therefore, improvements are desired to balance the flow of articles through laned conveyor systems. The claimed invention provides such an improvement by controlling the flow rate of individual lanes on a laned conveyor system.

SUMMARY OF THE INVENTION

The invention generally relates to a laned flow equalizer for monitoring and adjusting flow rates of articles on a conveyor system. The general object of the invention can be attained, at least in part, through a system for controlling a flow of articles. The system includes a conveyor driven in a direction to convey articles in the direction and a plurality of lanes disposed along a portion of the conveyor. Each lane of the plurality of lanes is configured to accept a row of articles along the direction. A plurality of sensors are included for counting the articles in each lane and a plurality of actuators are included for controlling flow rates of the articles along the conveyor. The flow rates are based on a lowest count of articles in a respective lane of the plurality of lanes.

At least one actuator of the plurality of actuators includes a paddle. The paddle can close off at least a portion of the plurality of lanes. The paddle is preferably pneumatically controlled. The paddle may also include a pressure regulator. The paddle can apply a degree of resistance to the articles via the pressure regulator.

Each lane of the plurality of lanes includes a counting circuit for counting the articles. The counting circuit includes a base flow rate for counting the articles. The counting circuit adjusts the flow of articles based on the base flow rate. Additionally, the plurality of lanes are of like size and shape. Preferably, the plurality of lanes includes 2-12 lanes.

Another general object of the invention can be attained through a system for controlling a flow of articles that includes a conveyor driven in a direction to convey articles in the direction and a plurality of walls disposed along a portion of the conveyor. The plurality of walls are arranged to form lanes along a surface of the conveyor through which articles can pass. A plurality of sensors are included for counting the articles and a plurality of actuators are included for controlling flow rates of the articles along the conveyor.

Yet another general object of the invention can be attained through a method for controlling a flow of articles. The method includes conveying articles down a conveyor, directing the articles into a plurality of lanes displaced along the conveyor, utilizing a plurality of sensors for counting the articles in each lane of the plurality of lanes, monitoring a flow rate of the articles in each lane of the plurality of lanes with a counting circuit, and adjusting the flow rate of the articles in at least one lane of the plurality of lanes to match a lower flow rate of the articles in at least one lane of the plurality of lanes.

The counting circuit determines a base flow rate of the articles. The flow rate of the articles is adjusted to match the base flow rate. The method also includes closing off at least a portion of the plurality of lanes with a paddle and applying a degree of resistance to the articles with a pressure regulator mounted to the paddle.

Other objects and advantages will be apparent to those skilled in the art from the following detailed description taken in conjunction with the appended claims and drawings.

DETAILED DESCRIPTION OF THE INVENTION

The present invention provides a laned container flow equalizer for use on a conveyor system. The invention includes a system for controlling a flow of articles as articles are conveyed and processed through a conveyor system. The invention also includes a method for controlling the flow of articles.

Figure 1:
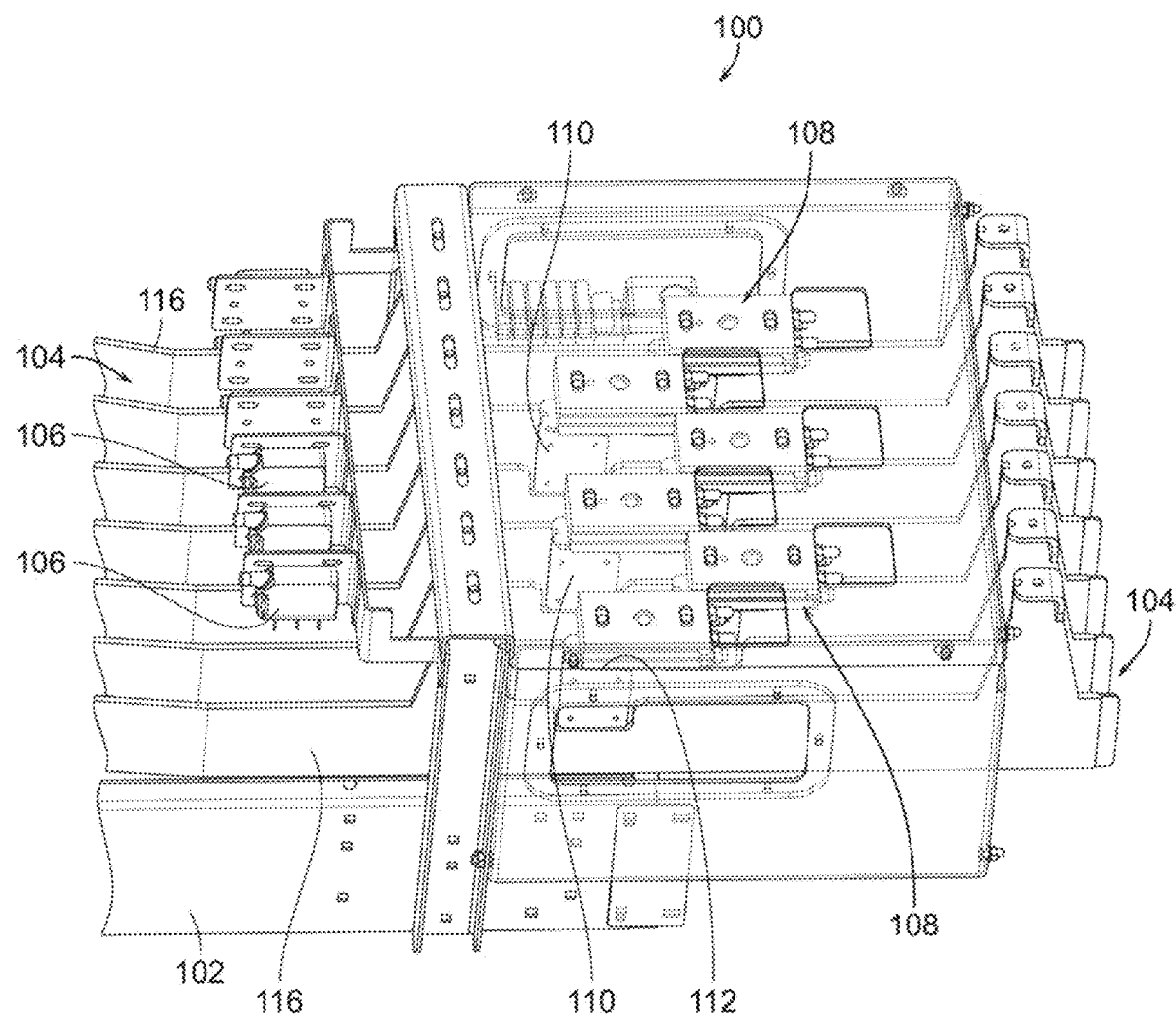
FIG. 1 shows a perspective view of a system for controlling a flow rate of articles according to one embodiment of the invention.

FIG. 1 shows a system 100 for controlling a flow of articles. The system 100 is incorporated into a conveyor 102. The system 100 includes a plurality of lanes 104 that are formed by walls 116. The lanes 104 are disposed along a surface of the conveyor 102 so that the walls 116 run perpendicular to the surface of the conveyor 102. The lanes 104 are arranged in line with a direction the conveyor 102 is traveling. Articles can be placed on the conveyor 102 to travel through the lanes 104. The lanes 104 are preferably arranged and sized so that a single file line of articles fits and travels through each individual lane 104. In this sense, each lane is preferably of like size and shape to the other lanes. The conveyor 102 can include any number of lanes (at least two, as many as 12) depending on the size of the surface of the conveyor and the size of the articles being conveyed. However, depending on the type/size of articles and purpose of conveyance, the lanes 104 may be modified in quantity, size, and/or shape to accommodate a different number or arrangement of articles.

On one end of the system 100, a plurality of sensors 106 are placed adjacent to the lanes 104. The sensors 106 can count the articles traveling through each lane 104. The sensors 106 count the articles as an input that can be sent to a controller (shown later in FIG. 2) to detect any imbalance between the counts of each lane 104. It is desirable in the present conveying system to maintain a precise numeric balance among lanes to keep the conveyor running smoothly. Each lane 104 of the plurality of lanes may have its own sensor 106. However, in additional embodiments, a master sensor can be used to monitor all lanes, or a select number of sensors can be used to monitor some lanes but not others.

On another portion of the system 100, a plurality of actuators 108 are placed adjacent to the lanes 104. Actuators produce motion and interference and are present to equalize flow rates of the lanes. The actuators 108 control the flow rates of the articles along the conveyor 102 as the articles travel through the lanes 104. The actuators therefore provide the ability to change the rate at which articles flow through each individual lane. Each lane 104 of the plurality of lanes may have its own actuator 108. However, in additional embodiments, the number of lanes using sensors and/or actuators can be selected.

At least one variety of actuator 108 includes a paddle 110. The paddle 110 is controlled by the actuator 108 and can close off at least a portion of the lanes 104. In one embodiment, the paddle can extend to close off a portion of the width of one lane. The paddle 110 is preferably pneumatically controlled using gas or air flow. Each lane 104 may have its own paddle 110 so that individual lanes can be opened for articles to flow through, or closed off (in full or partially) to slow the flow of articles. Each paddle 110 can be independently controlled by individual actuators 108 for each lane 104.

To ease the flow of articles with the paddle 110, the paddle 110 includes a pressure regulator 112. The pressure regulator 112 can be arranged directly on the paddle 110 or on the associated actuator 108. The pressure regulator 112 aids the paddle 110 in applying a degree of resistance to the articles when the paddle 110 is being used to close off at least a portion of one or more lanes 104. The pressure regulator 112 allows the paddle to apply resistance to the flow of articles without fully stopping the flow of articles. The pressure regulator therefore can change the rate of flow of articles by applying a degree of resistance to that flow (decreasing the flow rate). This is desired to restrict flow rates of heavier lanes-lanes that are flowing faster or have a build up of articles in comparison to other respective lanes. The system can restrict the flow of certain lanes without stopping the flow and without damaging the articles.

Figure 2:
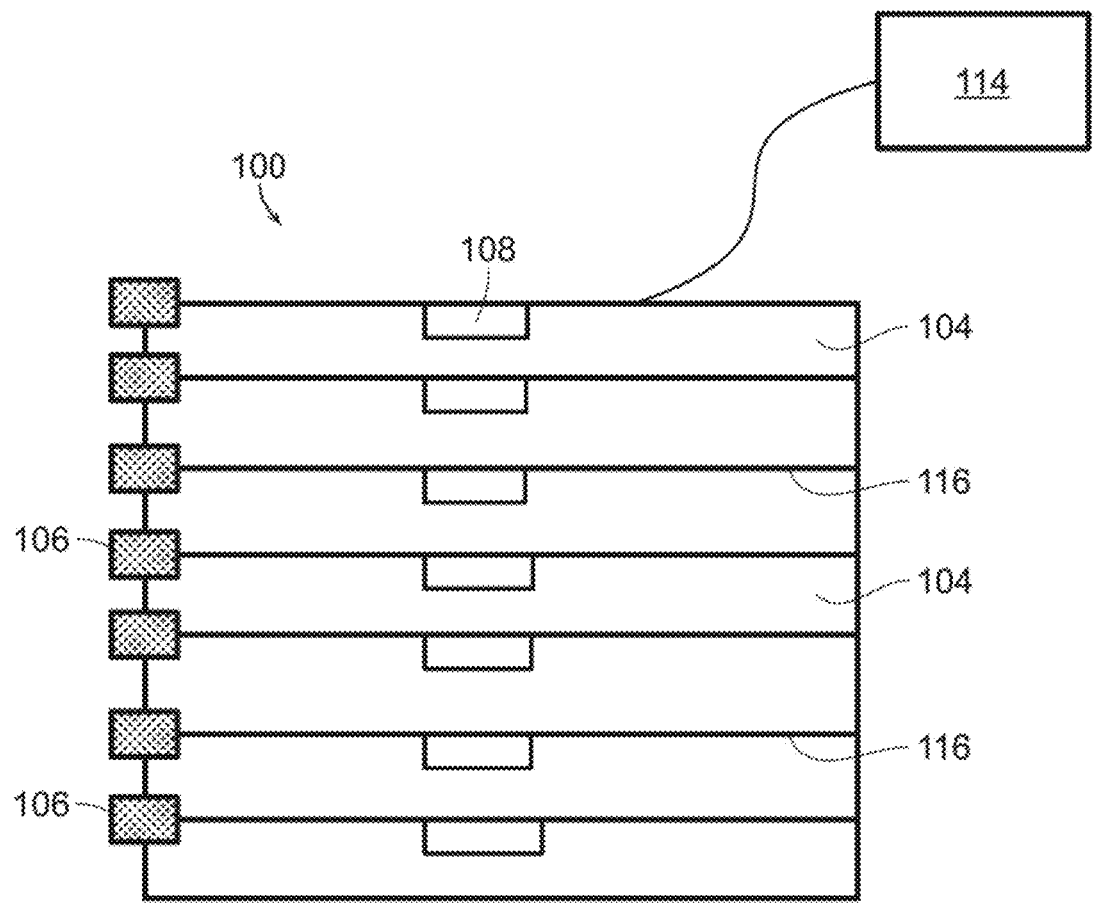
FIG. 2 shows a schematic view of a system for controlling a flow rate of articles according to one embodiment of the invention.

FIG. 2 shows a schematic of the system 100. Each lane 104 of the plurality of lanes includes a counting circuit for counting articles. The counting circuits are part of a controller 114 that manages and controls the flow of articles through the lanes 104. The controller 114 provides the system 100 with the ability to count and compare flow rates of the lanes as a basis for control. The sensors input data to the controller, where the controller counts the articles and configures mathematical comparisons across the lanes to then operate the paddle(s) in each lane as needed. Via the controller 114, the counting circuits determine a base flow rate for counting articles. The base flow rate is determined by comparing the various flow rates of articles flowing through each lane. The lane with the lowest flow rate preferably becomes the base flow rate.

Additional sensors 106 and/or actuators 108 may be placed throughout a desired system to maintain flow rates as described.

If a lane has an article count that exceeds the lane with the lowest count (the base flow rate), a paddle is extended into that lane to restrict its flow. This results in the article counts for the restricted lane to increase at a lower rate than the rate of the lane that determine the base flow rate. Any lanes that need to be restricted will be so restricted via the respective paddle until the flow rate of the restricted lane(s) match the base flow rate.

The controller can then utilize the system 100 components like the sensors, actuators and paddles to adjust the flow rates of all lanes to match the base flow rate. By doing this, the controller maintains a universal flow rate across all lanes to keep the conveyor running smoothly and at a common pace (based on the base flow rate). The system can slow the rate of flow of articles in a single lane using the paddle movement via the actuator. The system can adjust the flow rate of individual lanes by using the independent pressure regulators in each lane. The system can determine a flow rate imbalance across the plurality of lanes by accurately counting the articles in each lane, and then by correcting the flow rate if an imbalance is detected, without needing to stop the flow of articles. The system therefore reduces or eliminates lane imbalance issues associated with conveyors leading to cartoners, case packers, or other devices.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

The invention claimed is:

1. A system for controlling a flow of articles, comprising:
   a conveyor driven in a direction to convey articles in the direction;
   a plurality of lanes disposed along a portion of the conveyor, wherein each lane of the plurality of lanes is configured to accept a row of articles along the direction;
   a plurality of sensors for counting the articles in each lane; and
   a plurality of actuators for controlling flow rates of the articles along the conveyor, wherein the flow rates are based on a lowest count of articles in a respective lane of the plurality of lanes, wherein at least one actuator of the plurality of actuators comprises a paddle, wherein the paddle is configured to close off at least a portion of the plurality of lanes, wherein the paddle includes a pressure regulator.

2. The system for controlling a flow of articles according to claim 1, wherein the paddle is pneumatically controlled.

3. The system for controlling a flow of articles according to claim 1 wherein the paddle is configured to apply a degree of resistance to the articles via the pressure regulator.

4. The system for controlling a flow of articles according to claim 1, wherein each lane of the plurality of lanes comprises a counting circuit for counting the articles.

5. The system for controlling a flow of articles according to claim 4, wherein the counting circuit comprises a base flow rate for counting the articles, wherein the counting circuit adjusts the flow of articles based on the base flow rate.

6. The system for controlling a flow of articles according to claim 1, wherein the plurality of lanes are of like size and shape.

7. The system for controlling a flow of articles according to claim 1, wherein the plurality of lanes comprises 4-8 lanes.

8. A system for controlling a flow of articles, comprising:
a conveyor driven in a direction to convey articles in the direction;
a plurality of walls disposed along a portion of the conveyor, arranged to form a plurality of lanes along a surface of the conveyor;
a plurality of sensors for counting the articles; and
a plurality of actuators for controlling flow rates of the articles along the conveyor, wherein each lane of the plurality of lanes further comprises a pneumatically controlled paddle, wherein the paddle is configured to apply a degree of resistance to articles with a pressure regulator as the articles pass through the plurality of lanes.

9. The system for controlling a flow of articles according to claim 8, wherein each lane of the plurality of lanes is of like size and shape.

10. A method for controlling a flow of articles, comprising:
conveying articles down a conveyor;
directing the articles into a plurality of lanes displaced along the conveyor;
utilizing a plurality of sensors for counting the articles in each lane of the plurality of lanes;
monitoring a flow rate of the articles in each lane of the plurality of lanes with a counting circuit;
adjusting the flow rate of the articles in at least one lane of the plurality of lanes to match a lower flow rate of the articles in at least one lane of the plurality of lanes by closing off at least a portion of the plurality of lanes with a paddle; and
applying a degree of resistance to the articles with a pressure regulator mounted to the paddle.

11. The method for controlling a flow of articles according to claim 10, wherein the counting circuit determines a base flow rate of the articles.

12. The method for controlling a flow of articles according to claim 11, further comprising adjusting the flow rate of the articles to match the base flow rate.

13. The method for controlling a flow of articles according to claim 10, wherein the paddle is pneumatically controlled.

\* \* \* \* \*